US012647011B2

(12) United States Patent
Yamazaki et al.

(10) Patent No.: US 12,647,011 B2
(45) Date of Patent: Jun. 2, 2026

(54) VIBRATION MOTOR AND TACTILE DEVICE INCLUDING THE SAME

(71) Applicant: Nidec Corporation, Kyoto (JP)

(72) Inventors: Toshitaka Yamazaki, Kyoto (JP); Jun Inoue, Kyoto (JP); Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 296 days.

(21) Appl. No.: 18/380,732

(22) Filed: Oct. 17, 2023

(65) Prior Publication Data

US 2024/0128846 A1 Apr. 18, 2024

(30) Foreign Application Priority Data

Oct. 18, 2022 (JP) ................................. 2022-166753
Sep. 20, 2023 (JP) ................................. 2023-153997

(51) Int. Cl.
H02K 33/18 (2006.01)
H02K 5/22 (2006.01)

(52) U.S. Cl.
CPC ............. H02K 33/18 (2013.01); H02K 5/225 (2013.01)

(58) Field of Classification Search
CPC ........ H02K 5/225; H02K 33/18; H02K 33/12; H02K 33/00; H02K 33/02; H02K 33/04; H02K 33/06; H02K 33/16; H02K 35/00; H02K 35/02
USPC ................................................... 310/15–25
See application file for complete search history.

(56) References Cited

U.S. PATENT DOCUMENTS

| | | | | | |
|---|---|---|---|---|---|
| 8,680,722 | B2 * | 3/2014 | Park | ...................... | H02K 33/16 |
| | | | | | 310/1 |
| 9,461,530 | B2 * | 10/2016 | Wasenczuk | ............ | H02K 35/02 |
| 9,467,035 | B2 * | 10/2016 | Endo | ...................... | H02K 35/02 |
| 11,152,843 | B2 * | 10/2021 | Wasenczuk | .............. | H02K 1/34 |
| 11,831,215 | B2 * | 11/2023 | Li | ........................... | H02K 33/10 |
| 2006/0133218 | A1 * | 6/2006 | Matthey | .................. | B06B 1/045 |
| | | | | | 368/230 |
| 2008/0265692 | A1 * | 10/2008 | Roberts | .................... | H02K 1/34 |
| | | | | | 310/15 |
| 2009/0243410 | A1 * | 10/2009 | Kleibl | ..................... | B06B 1/166 |
| | | | | | 405/232 |
| 2009/0267423 | A1 * | 10/2009 | Kajiwara | ............... | H02K 33/02 |
| | | | | | 310/38 |
| 2010/0102646 | A1 * | 4/2010 | Masami | ................. | H02K 33/16 |
| | | | | | 310/29 |

(Continued)

*Primary Examiner* — Maged M Almawri
(74) *Attorney, Agent, or Firm* — Keating & Bennett, LLP

(57) ABSTRACT

A vibration motor includes a stationary portion and a movable portion to vibrate in a central axis direction with respect to the stationary portion. The stationary portion includes a housing and a coil on an outer side in a radial direction of the movable portion. The movable portion includes a core portion including a magnet. The housing houses the movable portion and the coil, and includes a peripheral wall portion on an outer side in the radial direction of the coil and extending in an axial direction, and a magnetic portion on a portion of the peripheral wall portion and including a magnetic body. At least a portion of the magnetic portion opposes the coil in the radial direction and extends in a circumferential direction. The peripheral wall portion includes a through hole adjacent to the magnetic portion in the axial direction and extends in the circumferential direction.

18 Claims, 9 Drawing Sheets

(56) References Cited

U.S. PATENT DOCUMENTS

| | | | | | |
|---|---|---|---|---|---|
| 2010/0213773 | A1* | 8/2010 | Dong | H02K 33/16 | 310/25 |
| 2010/0302752 | A1* | 12/2010 | An | H02K 33/06 | 361/807 |
| 2011/0018364 | A1* | 1/2011 | Kim | H02K 33/18 | 310/20 |
| 2011/0074228 | A1* | 3/2011 | Kim | H02K 33/16 | 310/29 |
| 2011/0089772 | A1* | 4/2011 | Dong | H02K 33/16 | 310/25 |
| 2011/0101797 | A1* | 5/2011 | Lee | H02K 33/16 | 310/29 |
| 2011/0115311 | A1* | 5/2011 | Dong | H02K 33/16 | 310/28 |
| 2011/0133577 | A1* | 6/2011 | Lee | H02K 33/18 | 310/15 |
| 2011/0227426 | A1* | 9/2011 | Lee | H02K 33/18 | 310/25 |
| 2011/0241451 | A1* | 10/2011 | Park | H02K 33/16 | 310/25 |
| 2011/0254782 | A1* | 10/2011 | Park | H02K 33/04 | 345/173 |
| 2011/0316361 | A1* | 12/2011 | Park | H02K 33/16 | 310/25 |
| 2012/0032535 | A1* | 2/2012 | Park | H02K 35/02 | 310/25 |
| 2012/0104875 | A1* | 5/2012 | Park | H02K 33/16 | 310/25 |
| 2012/0108299 | A1* | 5/2012 | Yang | H02K 33/16 | 455/567 |
| 2012/0153748 | A1* | 6/2012 | Wauke | H02K 33/16 | 310/25 |
| 2012/0169148 | A1* | 7/2012 | Kim | H02K 33/16 | 310/25 |
| 2012/0169151 | A1* | 7/2012 | Dong | H02K 33/16 | 310/25 |
| 2012/0170792 | A1* | 7/2012 | Li | H04R 9/066 | 381/412 |
| 2012/0187780 | A1* | 7/2012 | Bang | H02K 33/16 | 310/25 |
| 2012/0319506 | A1* | 12/2012 | Shim | H02K 33/16 | 310/25 |
| 2013/0099600 | A1* | 4/2013 | Park | B06B 1/045 | 310/15 |
| 2013/0099602 | A1* | 4/2013 | Park | H02K 33/16 | 310/25 |
| 2013/0119787 | A1* | 5/2013 | Yu | H02K 33/16 | 310/25 |
| 2013/0229070 | A1* | 9/2013 | Akanuma | H02K 33/00 | 310/25 |
| 2013/0241321 | A1* | 9/2013 | Akanuma | B06B 1/045 | 310/25 |
| 2013/0285479 | A1* | 10/2013 | Kinoshita | H02K 35/02 | 310/12.12 |
| 2014/0062224 | A1* | 3/2014 | Kim | H02K 33/16 | 310/15 |
| 2014/0152126 | A1* | 6/2014 | Kim | B06B 1/045 | 310/25 |
| 2014/0152148 | A1* | 6/2014 | Oh | B06B 3/00 | 310/321 |
| 2014/0306556 | A1* | 10/2014 | Kim | H02K 33/16 | 310/25 |
| 2015/0070792 | A1* | 3/2015 | Terajima | G02B 7/08 | 359/824 |
| 2015/0086066 | A1* | 3/2015 | Yan | H04R 9/025 | 381/412 |
| 2015/0181344 | A1* | 6/2015 | Jiang | H04R 31/006 | 381/400 |
| 2015/0328664 | A1* | 11/2015 | Kim | B06B 1/0644 | 310/323.01 |
| 2016/0173990 | A1* | 6/2016 | Park | H04R 9/043 | 381/354 |
| 2016/0198262 | A1* | 7/2016 | Wang | H04R 7/18 | 381/392 |
| 2016/0218607 | A1* | 7/2016 | Oh | H02K 33/16 | |
| 2016/0254736 | A1* | 9/2016 | Jin | H02K 33/16 | 310/25 |
| 2016/0381462 | A1* | 12/2016 | Wang | H04R 7/18 | 381/400 |
| 2017/0012515 | A1* | 1/2017 | Xu | H02K 33/02 | |
| 2017/0012517 | A1* | 1/2017 | Huang | H02K 33/00 | |
| 2017/0033653 | A1* | 2/2017 | Wang | H02K 33/16 | |
| 2017/0033657 | A1* | 2/2017 | Mao | H02K 33/16 | |
| 2017/0033664 | A1* | 2/2017 | Xu | H02K 33/18 | |
| 2017/0104401 | A1* | 4/2017 | Umehara | H02K 33/16 | |
| 2017/0110947 | A1* | 4/2017 | Mao | H02K 5/04 | |
| 2017/0120297 | A1* | 5/2017 | Chun | H02K 33/16 | |
| 2017/0214306 | A1* | 7/2017 | Katada | H02K 33/16 | |
| 2017/0250596 | A1* | 8/2017 | Son | H02K 7/08 | |
| 2017/0288519 | A1* | 10/2017 | Kim | H02K 33/16 | |
| 2018/0021812 | A1* | 1/2018 | Akanuma | H02K 33/00 | 310/25 |
| 2018/0056329 | A1* | 3/2018 | Akanuma | H02K 33/16 | |
| 2018/0166961 | A1* | 6/2018 | Guo | H02K 33/18 | |
| 2018/0241295 | A1* | 8/2018 | Zu | H02K 33/14 | |
| 2018/0250107 | A1* | 9/2018 | Dai | H02K 1/2791 | |
| 2019/0044425 | A1* | 2/2019 | Zu | H02K 33/02 | |
| 2019/0151895 | A1* | 5/2019 | Takahashi | B06B 1/045 | |
| 2019/0206601 | A1* | 7/2019 | Wauke | H01F 7/0289 | |
| 2019/0356208 | A1* | 11/2019 | Okayasu | B06B 1/045 | |
| 2020/0044537 | A1* | 2/2020 | Huang | H02K 33/16 | |
| 2020/0059145 | A1* | 2/2020 | Kitahara | H02K 33/16 | |
| 2020/0212775 | A1* | 7/2020 | Tang | H02K 33/16 | |
| 2020/0212776 | A1* | 7/2020 | Ling | H02K 33/16 | |
| 2021/0067021 | A1* | 3/2021 | Maeda | H02K 33/16 | |
| 2021/0194342 | A1* | 6/2021 | Kitahara | H02K 33/18 | |
| 2022/0352801 | A1* | 11/2022 | Kitahara | H02K 33/02 | |
| 2022/0352802 | A1* | 11/2022 | Hatano | H02K 33/16 | |

* cited by examiner

VIBRATION MOTOR AND TACTILE DEVICE INCLUDING THE SAME

CROSS-REFERENCE TO RELATED APPLICATIONS

The present application claims priority under 35 U.S.C. § 119 to Japanese Patent Application No. 2022-166753, filed on Oct. 18, 2022, and Japanese patent Application No. 2023-153997, filed on Sep. 20, 2023, the entire contents of which are hereby incorporated herein by reference.

1. FIELD OF THE INVENTION

The present disclosure relates to a vibration motor and a tactile device including the vibration motor.

2. BACKGROUND

A conventional vibration motor includes a stationary portion and a movable portion. The movable portion is capable of vibrating in a central axis direction with respect to the stationary portion. The stationary portion includes a housing and a coil. The movable portion includes a magnet. The housing houses the movable portion and the coil. The coil surrounds the outer side in a radial direction of the movable portion. When the coil is energized and a magnetic field is generated, the movable portion vibrates.

However, in the conventional vibration motor, there has been a possibility that the movable portion vibrates in a case where there is an impact from the outside in a state where the coil is not energized. Note that the impact from the outside is, for example, an impact received when a person performs writing operation by holding a tactile device. In a case where the movable portion in the vibration motor swings due to an impact from the outside, there has been a possibility that vibration is transmitted to a tactile device, and a sense of discomfort is generated in a tactile sense of the tactile device.

SUMMARY

A vibration motor according to an example embodiment of the present disclosure includes a stationary portion and a movable portion. The movable portion is capable of vibrating in a central axis direction with respect to the stationary portion. The stationary portion includes a coil and a housing. The coil is located on an outer side in a radial direction of the movable portion. The housing houses the movable portion and the coil. The movable portion includes a core portion including a magnet. The housing includes a peripheral wall portion and a magnetic portion. The peripheral wall portion is located on the outer side in the radial direction of the coil and extends in an axial direction. The magnetic portion is located on at least a portion of the peripheral wall portion and includes a magnetic body. At least a portion of the magnetic portion opposes the coil in the radial direction and extends in a circumferential direction. The peripheral wall portion includes a through hole that is adjacent to the magnetic portion in the axial direction and extends in the circumferential direction.

The above and other elements, features, steps, characteristics and advantages of the present disclosure will become more apparent from the following detailed description of the example embodiments with reference to the attached drawings.

DETAILED DESCRIPTION

Figure 1:
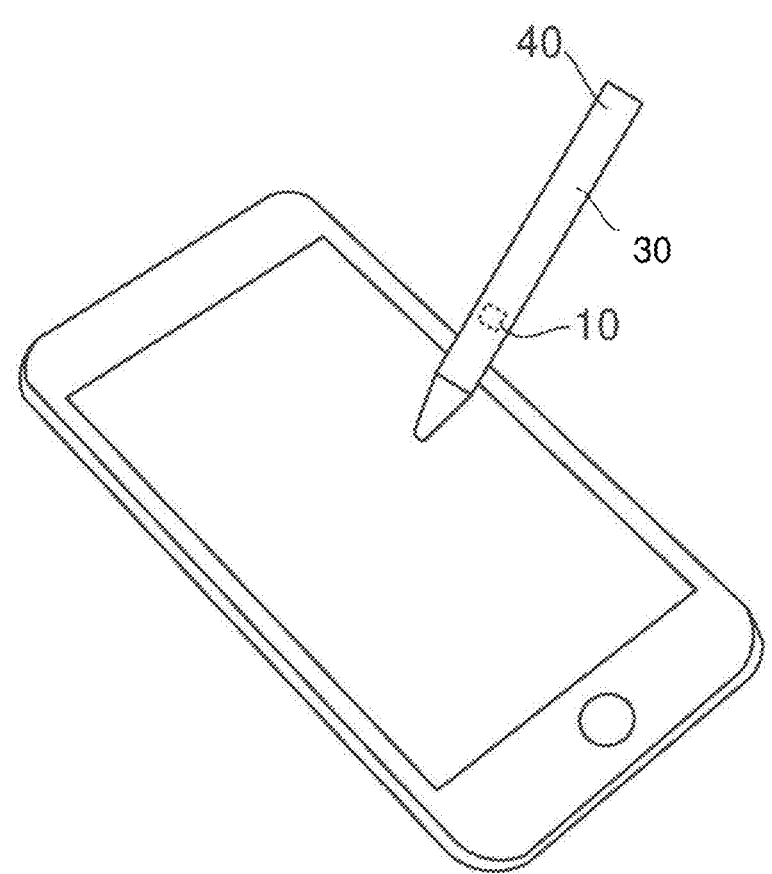
FIG. 1 is an explanatory view schematically illustrating a touch pen on which a vibration motor according to a first example embodiment of the present disclosure is mounted.

Hereinafter, example embodiments of the present disclosure will be described in detail with reference to the accompanying drawings. In the present description, an "axial direction" in which a central axis J of a vibration motor 10 extends is indicated as an X direction. In the drawings, an arrow side in the X direction indicates a "first side in the axial direction", and an opposite side indicates a "second side in the axial direction".

Further, in the drawings, a first direction orthogonal to the central axis J is indicated as a Y direction. In the drawings, an arrow side in the Y direction indicates a "first side in the first direction Y", and an opposite side indicates a "second side in the first direction Y". Further, in the drawings, a second direction orthogonal to the central axis J and the first direction Y is indicated as a Z direction. An arrow side in the Z direction indicates a "first side in the second direction Z", and an opposite side indicates a "second side in the second direction Z".

Further, a direction orthogonal to the central axis J is referred to as a "radial direction". Further, a direction about the central axis J will be referred to as a "circumferential direction". Note that each of the above directions does not limit a direction when the vibration motor 10 is incorporated in a device.

Figure 2:
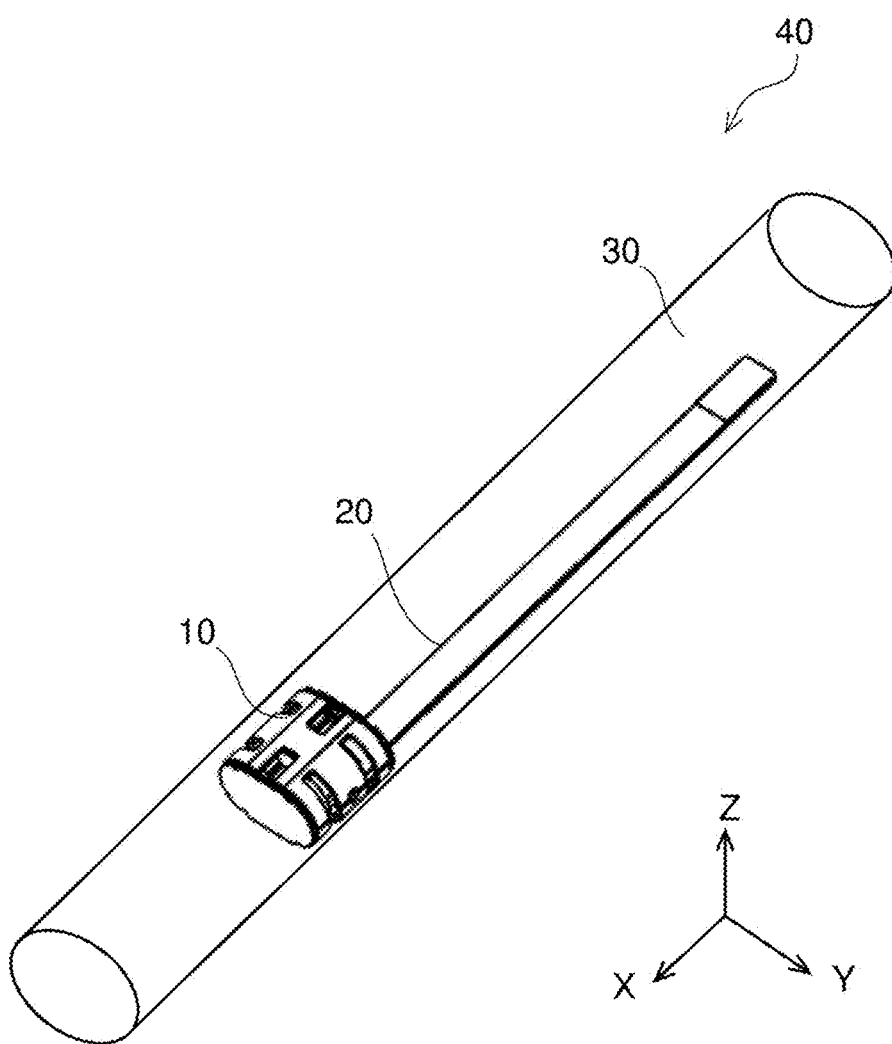
FIG. 2 is a perspective view of a touch pen according to the first example embodiment of the present disclosure.

FIG. 1 is a schematic diagram illustrating a touch pen (tactile device) 40 on which the vibration motor 10 according to an exemplary example embodiment of the present disclosure is mounted. FIG. 2 is a perspective view of the touch pen 40. Note that, in FIG. 2, for convenience, the vibration motor 10 and a substrate 20 are illustrated in a transparent manner.

The touch pen 40 is a device that is operated by being brought into contact with a touch panel such as a smartphone. The touch pen 40 includes a case 30, the substrate 20, and the vibration motor 10. Further, the touch pen 40 has a pen tip portion (not illustrated) attached to a tip portion on a first side in the axial direction of the case 30.

The case 30 has a cylindrical shape extending in the axial direction. The vibration motor 10 is mounted on the substrate 20. The vibration motor 10 and the substrate 20 are housed inside the case 30. That is, the touch pen (tactile device) 40 includes the vibration motor 10 and the case 30 having a cylindrical shape, the case 30 extending in the axial direction and housing the vibration motor 10.

The substrate 20 is, for example, a flexible printed circuit (FPC), and is electrically connected to the vibration motor 10. Vibration of the vibration motor 10 provides, for example, the user with a feeling of writing a character or the like on paper or the like with the touch pen 40.

Figure 3:
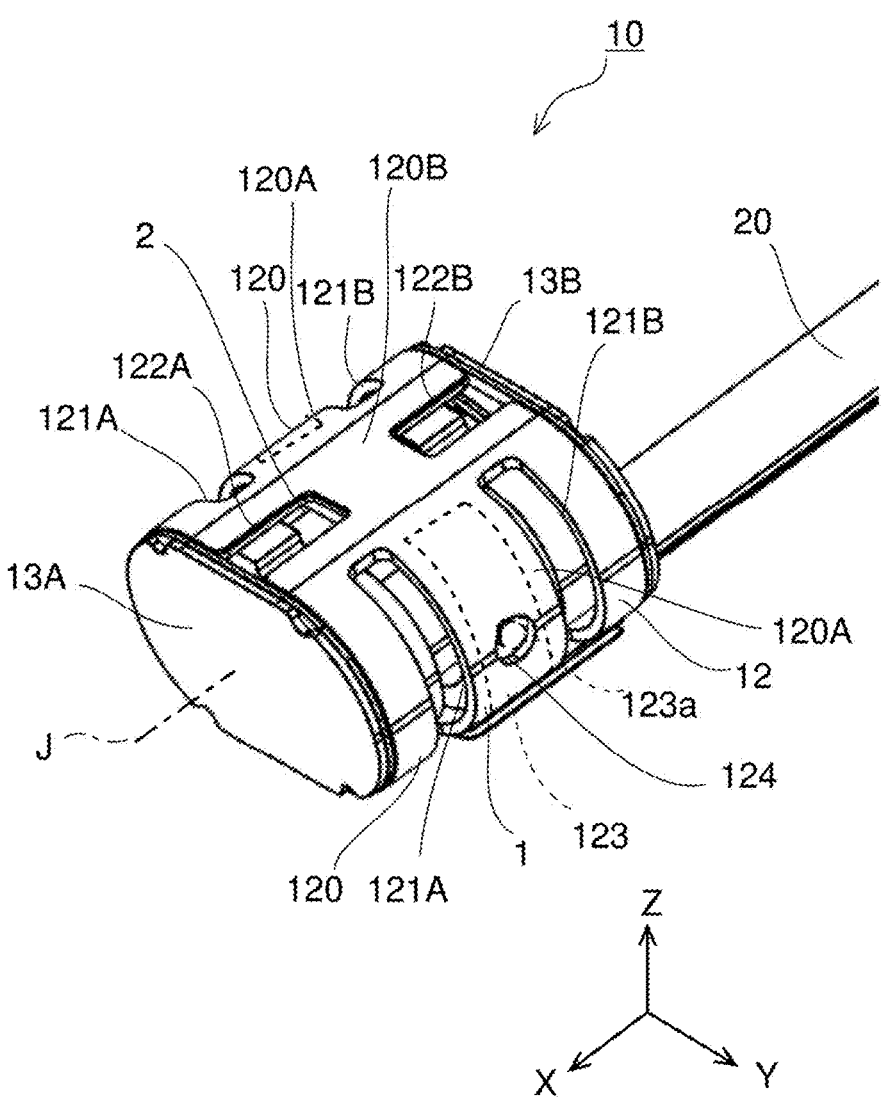
FIG. 3 is a perspective view of the vibration motor according to the first example embodiment of the present disclosure.
Figure 4:
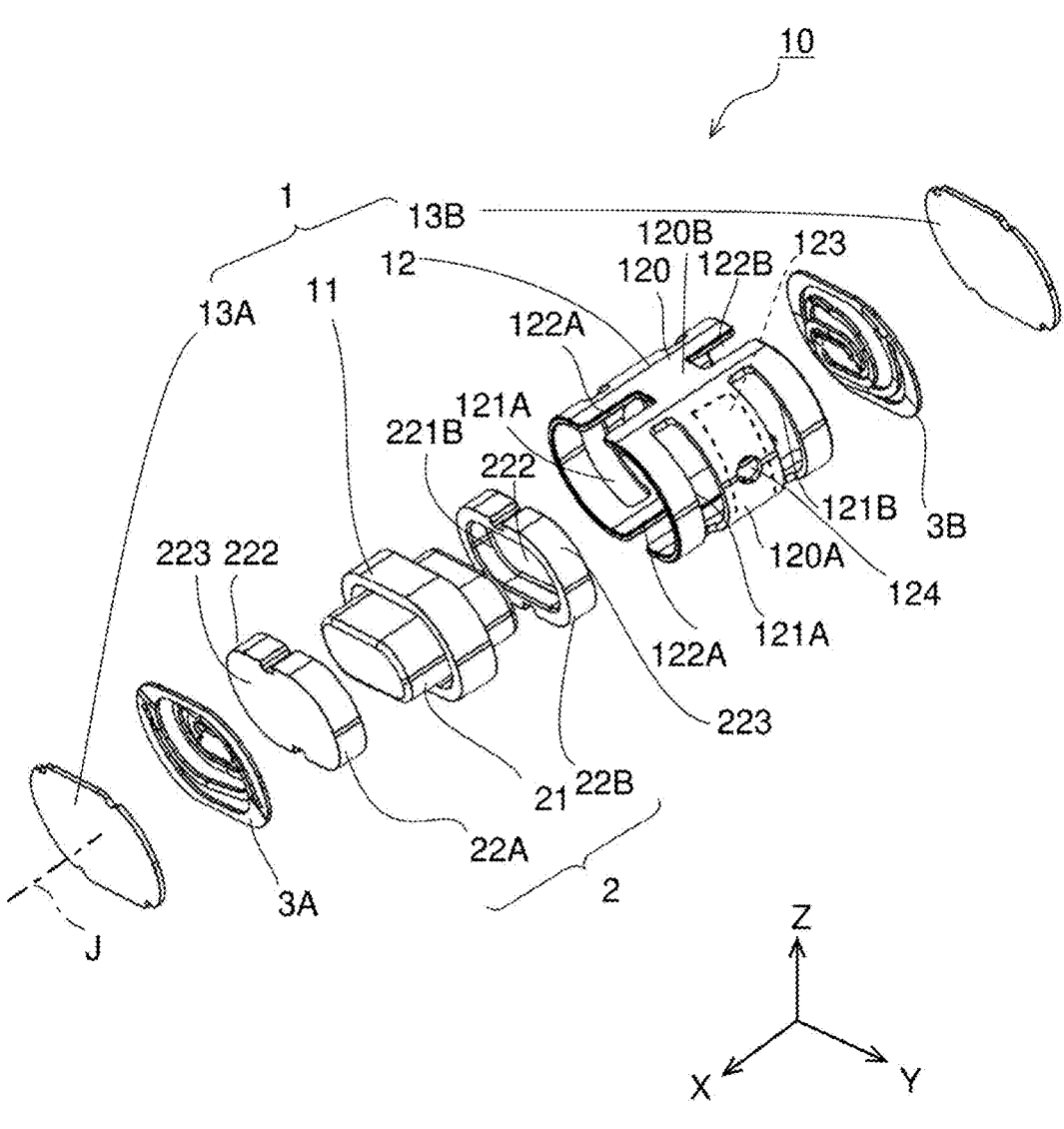
FIG. 4 is an exploded perspective view of the vibration motor according to the first example embodiment of the present disclosure.
Figure 5:
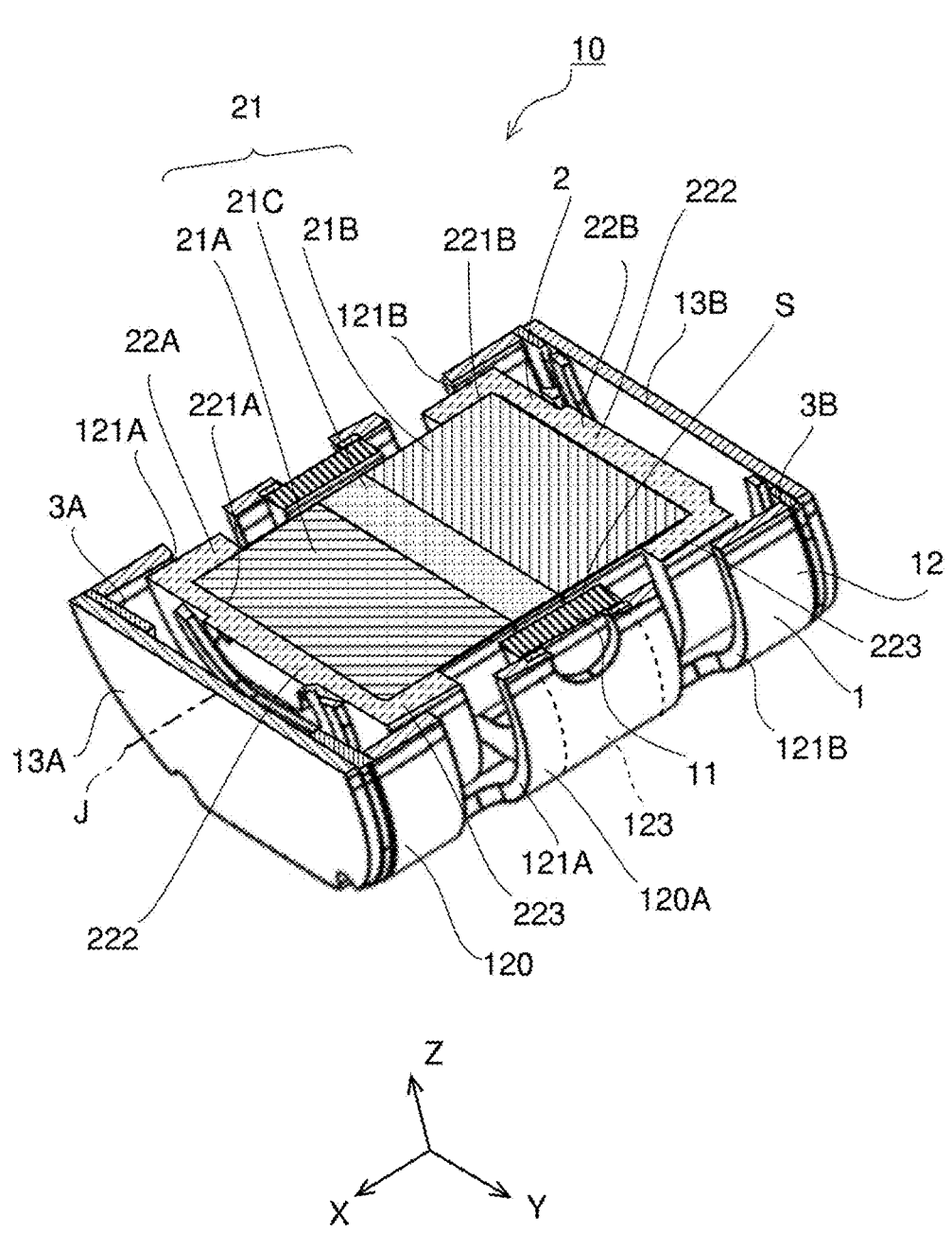
FIG. 5 is a perspective view of the vibration motor according to the first example embodiment of the present disclosure cut along a central axis.
Figure 6:
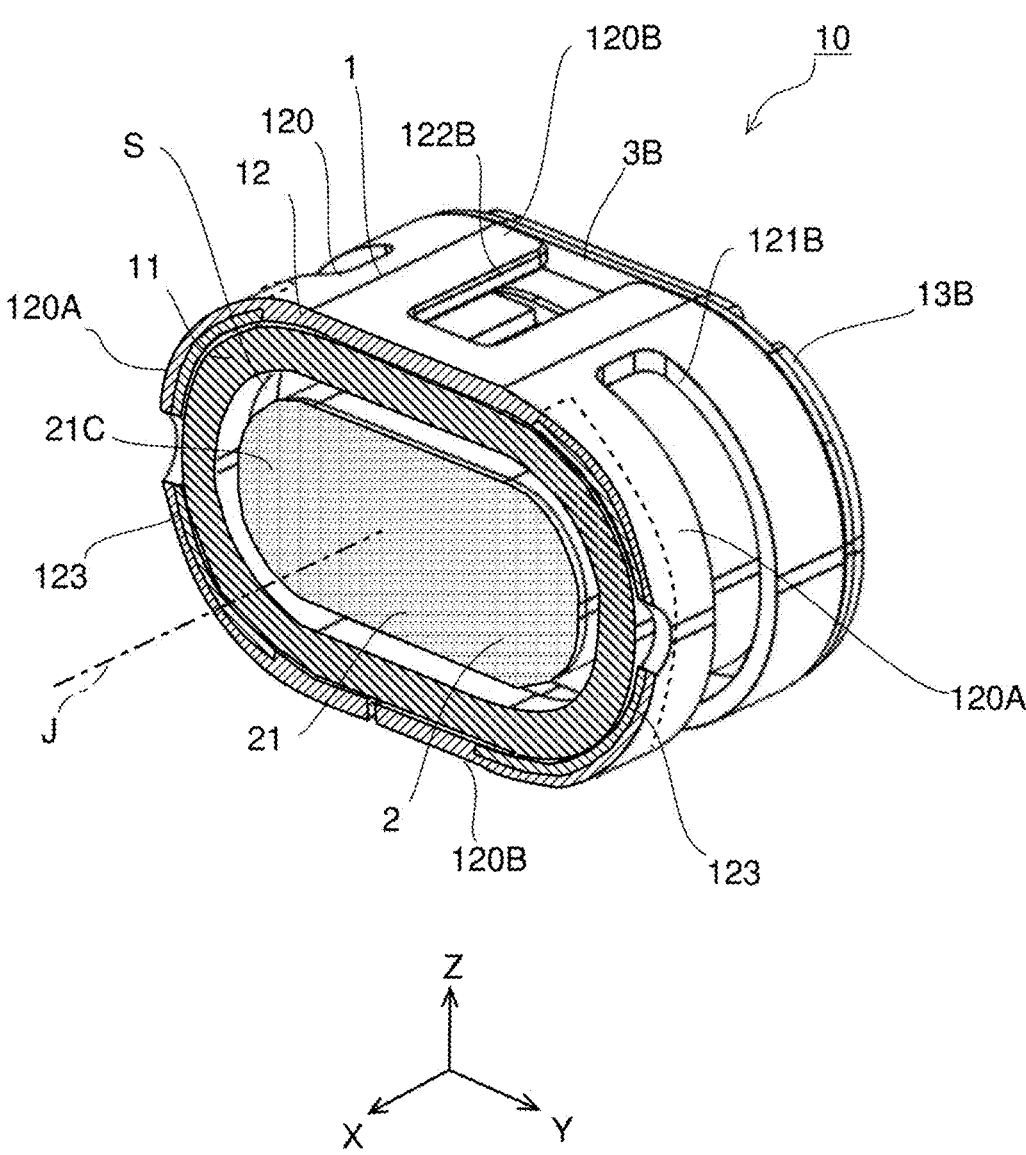
FIG. 6 is a perspective view of the vibration motor according to the first example embodiment of the present disclosure cut in a direction orthogonal to the central axis.

FIG. 3 is a perspective view of the vibration motor 10. FIG. 4 is an exploded perspective view of the vibration motor 10. FIG. 5 is a perspective view of the vibration motor 10 cut along the central axis J direction. FIG. 6 is a perspective view of the vibration motor 10 cut in a direction orthogonal to the central axis J direction.

The vibration motor 10 includes a stationary portion 1, a movable portion 2, and elastic members 3A and 3B. The movable portion 2 is connected to the stationary portion 1 via the elastic members 3A and 3B, and the movable portion 2 can vibrate in the central axis J direction with respect to the stationary portion 1.

The stationary portion 1 includes a coil 11 and a housing 12. The coil 11 is formed as a conductive wire (not illustrated) is wound around the central axis J on the outer side in the radial direction of a core portion 21 included in the movable portion 2 described later. That is, the stationary portion 1 includes the coil 11 disposed on the outer side in the radial direction of the movable portion 2.

The housing 12 is formed in a cylindrical shape, and houses the movable portion 2 and the coil 11 in the inside. The housing 12 includes a peripheral wall portion 120, a magnetic portion 123, and lid portions 13A and 13B. The peripheral wall portion 120 is disposed on the outer side in the radial direction of the coil 11 and extends in the axial direction.

Further, in the present example embodiment, the housing 12 is formed in a cylindrical shape surrounding the coil 11 from the outer side in the radial direction, but the housing 12 may be formed in a rectangular parallelepiped box shape, for example. At this time, the coil 11 does not need to be formed to surround the movable portion 2. For example, a pair of the coils 11 may be disposed on opposing inner surfaces of the box-shaped housing 12 with the movable portion 2 interposed between them. By the above, a shape of the housing 12 can appropriately be matched with a shape of the touch pen 40. Therefore, the touch pen 40 can be downsized. Note that, in the present example embodiment, the vibration motor 10 is mounted on the touch pen 40. However, in a case where the vibration motor 10 is mounted on an actual machine other than the touch pen 40, the actual machine can be downsized.

In the present example embodiment, the peripheral wall portion 120 has a cylindrical shape and is formed of a resin molded article. The housing 12 can be reduced in weight as the peripheral wall portion 120 is formed with resin. Further, interference between a magnetic force generated by the coil 11 and the peripheral wall portion 120 can be reduced. The peripheral wall portion 120 is formed in an elliptical shape in a cross-sectional view orthogonal to the central axis J.

Note that the peripheral wall portion 120 is determined by a shape of the housing 12, and does not need to have a cylindrical shape but may have a box shape. Further, the peripheral wall portion 120 does not need to have an elliptical shape in a cross-sectional view orthogonal to the central axis J. The peripheral wall portion 120 may have, for example, a quadrangular shape in a cross-sectional view orthogonal to the central axis J.

In the present example embodiment, the peripheral wall portion 120 includes an arc portion 120A and a flat plate portion 120B. The arc portion 120A is formed to be curved in an arc shape when viewed from the axial direction, and the flat plate portion 120B is formed in a flat plate shape. The flat plate portion 120B is linear when viewed from the axial direction, and the arc portion 120A is curved to protrude to the outer side in the radial direction.

A pair of the arc portions 120A have both ends in the first direction Y connected to the flat plate portion 120B to form a cylindrical body. A pair of the arc portions 120A and a pair of the flat plate portions 120B are provided, and the arc portions 120A face each other in the first direction Y. Further, the flat plate portions 120B face each other in the second direction Z. The substrate 20 is disposed on the flat plate portion 120B. Further, the magnetic portion 123 is disposed on the arc portion 120A.

The magnetic portion 123 is disposed in a part of the peripheral wall portion 120. Further, the magnetic portion 123 includes a magnetic body. A configuration of the peripheral wall portion 120 and the magnetic portion 123 will be described in detail later.

The coil 11 is fixed to an inner peripheral surface of the peripheral wall portion 120 using a jig. The coil 11 and the housing 12 are bonded to each other via, for example, an adhesive. By the above, heat generated in a case where current flows through the coil 11 is transmitted to the housing 12 and dissipated. Note that a method of fixing the coil 11 and the peripheral wall portion 120 is not limited to an adhesive. Further, at least a part of the coil 11 overlaps a central portion in the axial direction X of the housing 12 in the radial direction. Further, at least a part of the coil 11 overlaps a central portion in the axial direction X of the core portion 21 described later in the radial direction. By the above, a magnetic force generated by the coil 11 stably acts on the core portion 21 of the movable portion 2 described later.

The lid portions 13A and 13B cover both end surfaces in the axial direction X of the opening housing 12 from the outer side in the axial direction X. The lid portions 13A and 13B are fixed to a peripheral edge of an opening portion of the peripheral wall portion 120 by laser welding. Note that a method of fixing the lid portions 13A and 13B and the peripheral wall portion 120 is not limited to laser welding. The lid portions 13A and 13B can prevent a foreign matter such as dust from entering the inside of the housing 12. In the present example embodiment, the lid portion 13A is disposed on the first side in the axial direction X of the elastic member 3A and is fixed to the elastic member 3A. Further, the lid portion 13B is disposed on the second side in the axial direction X of the elastic member 3B and is fixed to the elastic member 3B.

The movable portion 2 includes the core portion 21 made of a magnetic member such as ferrite or neodymium, and holders 22A and 22B. The core portion 21 is formed in a columnar shape extending in the central axis J direction.

The core portion 21 includes magnets 21A and 21B and a core magnetic body 21C (see FIG. 5). The core portion 21 is divided into three layers, the magnets 21A and 21B and the core magnetic body 21C, by magnetizing one magnetic member. The magnets 21A and 21B are arranged in the axial direction X with the core magnetic body 21C interposed between them. For example, in the magnet 21A, the first side in the axial direction X is an S pole, and the second side in the axial direction X is an N pole. Further, in the magnet 21B, the first side in the axial direction X is an N pole, and the second side in the axial direction X is an S pole. By the above, the N poles of the magnets 21A and 21B face each other in the axial direction X with the core magnetic body 21C interposed between them. Note that, in the magnets 21A and 21B, the S poles may face each other in the axial direction X with the core magnetic body 21C interposed between them. Further, in the present example embodiment, the core portion 21 is configured by magnetizing one magnetic member, but the core portion 21 may be configured by connecting a plurality of magnets in the axial direction X. At this time, the magnet can be connected via an adhesive.

The core portion 21 is formed in an elliptical shape in a cross-sectional view orthogonal to the central axis J. A gap S is formed between an outer peripheral surface of the core portion 21 and an inner peripheral surface of the coil 11 (See FIGS. 5 and 6). The gap S is formed to have substantially the same width in an entire area in the circumferential direction. By the above, a magnetic force acting between the coil 11 and the core portion 21 becomes uniform in the circumferential direction, and vibration of the core portion 21 is stabilized. Note that a shape of the core portion 21 can be changed according to a shape of the peripheral wall portion 120 and the coil 11, and for example, may be formed in a quadrangular shape in a cross-sectional view orthogonal to the central axis J.

The holders 22A and 22B sandwich and hold the core portion 21 from both sides in the axial direction X. The holders 22A and 22B function as weights, and are made of metal, for example. An example of the metal is a tungsten alloy. An inner end in the axial direction X of the holders 22A and 22B is disposed further on the outer side in the axial direction X than the coil 11. By the above, the holders 22A and 22B and the coil 11 do not contact each other even if they vibrate.

The holders 22A and 22B have a holder plate portion 222 having a plate shape, and a holder wall portion 223. The holder plate portion 222 faces the core portion 21 in the axial direction X. The holder wall portion 223 protrudes in the axial direction X from an outer peripheral edge of the holder plate portion 222 and surrounds an end portion in the axial direction X of the core portion 21. By the above, the holder 22A has a recessed portion 221A that is recessed toward the first side in the axial direction X. An end portion on the first side in the axial direction X of the core portion 21 is disposed in the recessed portion 221A. The holder 22B has a recessed portion 221B recessed toward the second side in the axial direction X. An end portion on the second side in the axial direction X of the core portion 21 is disposed in the recessed portion 221B. The holders 22A and 22B may be fixed to the core portion 21 via an adhesive in the recessed portions 221A and 221B, or may be fixed by press-fitting.

In a case where the core portion 21 is fixed in the recessed portions 221A and 221B via an adhesive, a groove for releasing an adhesive to the outside of the recessed portions 221A and 221B may be provided on an inner peripheral surface of the recessed portions 221A and 221B. Further, in a case where the core portion 21 is press-fitted into the recessed portions 221A and 221B, a rib that protrudes from an inner peripheral surface of the recessed portions 221A and 221B and collapses at the time of press-fitting may be provided. By the above, the holders 22A and 22B and the core portion 21 can be more firmly fixed.

In the present example embodiment, the elastic members 3A and 3B are leaf springs having elasticity in the axial direction X. In the elastic member 3A, an end portion on the first side in the axial direction X is fixed to the lid portion 13A, and an end portion on the second side in the axial direction X is fixed to the holder 22A. The elastic member 3B has an end portion on the second side in the axial direction X fixed to the lid portion 13B and an end portion on the first side in the axial direction X fixed to the holder 22B. By the above, the movable portion 2 is supported so as to be able to vibrate in the axial direction X with respect to the housing 12. Note that the elastic members 3A and 3B may be a coil spring or gel other than a leaf spring.

The vibration motor 10 supplies current to the coil 11 via the substrate 20, so that a magnetic force is generated in the coil 11. At this time, a line of magnetic force of the coil 11 and a line of magnetic force generated in the core portion 21 interact with each other. By controlling current supply to the coil 11, the core portion 21 vibrates in the axial direction X via the elastic members 3A and 3B.

In the present example embodiment, the magnetic portion 123 is formed of a metal plate curved in an arc shape, and is arranged one by one in each of the arc portions 120A. The magnetic portion 123 includes stainless steel which is a magnetic body, and is insert-molded on the peripheral wall portion 120. By the insert molding, the magnetic portion 123 is integrated with the peripheral wall portion 120 and is firmly fixed to the peripheral wall portion 120. Further, by using stainless steel which is a magnetic body for the magnetic portion 123, strength of the peripheral wall portion 120 can be improved and manufacturing cost can be reduced. Note that SUS430 is suitably used as stainless steel.

The magnetic portion 123 may be formed of, for example, a magnetic metal such as iron, nickel, or cobalt other than stainless steel. Further, the magnetic portion 123 may be disposed across the arc portion 120A and the flat plate portion 120B. Further, the magnetic portion 123 may be formed in an annular shape.

In the present example embodiment, the magnetic portion 123 is exposed from an inner peripheral surface of the peripheral wall portion 120. By the above, it is possible to prevent decrease in a magnetic force acting between the core portion 21 and the magnetic portion 123 as compared with a case where the magnetic portion 123 is covered with resin constituting the peripheral wall portion 120.

At least a part of the magnetic portion 123 faces the coil 11 in the radial direction and extends in the circumferential direction. The core portion 21 including the magnets 21A and 21B is attracted to the outer side in the radial direction with the magnetic portion 123. By the above, it is possible to reduce vibration of the core portion 21 in a state where the coil 11 is not energized. Further, the magnetic portion 123 is disposed in a part of the peripheral wall portion 120, and can reduce interference between a magnetic force generated by the coil 11 and the magnetic portion 123 as compared with a case where the entire peripheral wall portion 120 is formed of a magnetic material. By the above, it is possible to prevent lowering in driving efficiency of the vibration motor 10 and to reduce power consumption.

A surface area of an inner peripheral surface of the magnetic portion 123 is half or less of a surface area of an inner peripheral surface of the peripheral wall portion 120. Further, a length in the axial direction X of the magnetic portion 123 is half or less of a length in the axial direction X of the peripheral wall portion 120. By reducing a surface area of the magnetic portion 123 and shortening a length in the axial direction X of the magnetic portion 123, it is possible to further reduce interference between a magnetic force generated by the coil 11 and the magnetic portion 123. Further, a magnetic force in the radial direction acting between the magnetic portion 123 and the core portion 21 is reduced. Therefore, lowering in driving efficiency of the vibration motor 10 can be further prevented.

Further, at least a part of the magnetic portion 123 overlaps a central portion in the axial direction X of the peripheral wall portion 120 in the radial direction. By the above, the core portion 21 is prevented from being inclined with respect to the central axis J and is attracted to the outer side in the radial direction. Therefore, it is possible to further reduce vibration of the core portion 21 in a state where the coil 11 is not energized.

Further, a length in the axial direction X of the magnetic portion 123 is half or more of a length in the axial direction X of the core portion 21. By the above, a constant magnetic force acts between the core portion 21 and the magnetic portion 123 while interference between a magnetic force generated by the coil 11 and the magnetic portion 123 is reduced. Therefore, it is possible to reduce vibration of the core portion 21 in a state where the coil 11 is not energized.

Further, a length in the axial direction X of the magnetic portion 123 is substantially the same as a length in the axial direction X of the coil 11. By the above, a constant magnetic force acts between the core portion 21 and the magnetic portion 123 while interference between a magnetic force generated by the coil 11 and the magnetic portion 123 is reduced.

The peripheral wall portion 120 has through holes 121A and 121B, through holes (notched through holes) 122A and 122B, and a coil exposure hole 124. The through hole 121A extends in the circumferential direction adjacent to the magnetic portion 123 on the first side in the axial direction X. The through hole 121B is adjacent to the magnetic portion 123 on the second side in the axial direction X and extends in the circumferential direction. By providing the through holes 121A and 121B, it is possible to reduce weight of the peripheral wall portion 120 while securing a region where the magnetic portion 123 is disposed.

Further, the through holes 121A and 121B are arranged on both sides in the axial direction X of the magnetic portion 123, and are formed in plane symmetry with respect to a plane perpendicular to the axial direction X with the magnetic portion 123 interposed between them. By the above, the peripheral wall portion 120 is stabilized against vibration in the axial direction X of the core portion 21.

A plurality of the through holes 121A and 121B are disposed in the circumferential direction of the peripheral wall portion 120. In the present example embodiment, the through holes 121A and 121B are arranged at two locations in the circumferential direction. Note that the through holes 121A and 121B may be disposed at one location or at three or more locations in the circumferential direction.

The through holes (notched through holes) 122A and 122B are formed by being notched in the axial direction X from an outer end in the axial direction X of the peripheral wall portion 120. To be more specific, the through hole (notched through hole) 122A is formed by being notched from an end edge on the first side in the axial direction X toward the second side in the axial direction X of the peripheral wall portion 120. Further, the through holes 122A are arranged at two locations between the through holes 121A arranged in the circumferential direction. The through hole (notched through hole) 122B is formed by being notched from an end edge on the second side in the axial direction X of the peripheral wall portion 120 toward the first side in the axial direction X. In addition, the through holes 122B are arranged at two locations between the through holes 121B arranged in the circumferential direction. By providing the through holes (notched through holes) 122A and 122B, it is possible to further reduce weight of the peripheral wall portion 120. A width in the circumferential direction of the magnetic portion 123 is made smaller by provision of the through holes 122A and 122B. At this time, interference between a magnetic force generated by the coil 11 and the magnetic portion 123 can be reduced. By the above, it is possible to prevent lowering in driving efficiency of the vibration motor 10 and to reduce power consumption.

Note that the through holes (notched through holes) 122A and 122B may be disposed at one location or at three or more locations in the circumferential direction. Further, only one of the through holes (notched through holes) 122A and 122B may be provided. By reducing an area of the through holes (notched through holes) 122A and 122B, a wider region where the magnetic portion 123 is disposed can be secured. On the other hand, by increasing an area of the through holes (notched through holes) 122A and 122B, it is possible to further reduce weight of the peripheral wall portion 120.

At least a part of the coil exposure hole 124 is disposed to face the coil 11 in the radial direction, and penetrates the peripheral wall portion 120 in the radial direction. In the present example embodiment, the magnetic portion 123 has a magnetic through hole 123a (see FIG. 3). The magnetic through hole 123a is disposed to face the coil exposure hole 124 in the radial direction and penetrates in the radial direction. By the above, the coil 11 is exposed to the outside of the peripheral wall portion 120 via the coil exposure hole 124 and the magnetic through hole 123a.

After the coil 11 is inserted into the housing 12, an adhesive (not illustrated) is injected from the outside of the housing 12 through the coil exposure hole 124 and the magnetic through hole 123a. By the above, the coil 11 is fixed to the housing 12 via an adhesive. Therefore, by forming the coil exposure hole 124 and the magnetic through hole 123a, the coil 11 can be easily fixed inside the housing 12.

Note that a width in the axial direction of the coil exposure hole 124 is preferably smaller than a length in the axial direction X of the coil 11. By forming the coil exposure hole 124 to be small, a region of the magnetic portion 123 can be expanded. By the above, by securing a wide region of the magnetic portion 123, it is possible to further reduce vibration of the core portion 21 in a state where the coil 11 is not energized.

A lead wire (not illustrated) connected to the coil 11 is drawn out to the outside of the peripheral wall portion 120 through the through hole (notched through hole) 122B. The drawn lead wire is connected to the substrate 20. This allows the coil 11 to be electrically connected to the substrate 20 by a short lead wire. Note that the lead wire (not illustrated) may be drawn out to the outside of the peripheral wall portion 120 through the through hole (notched through hole) 122A.

Figure 7:
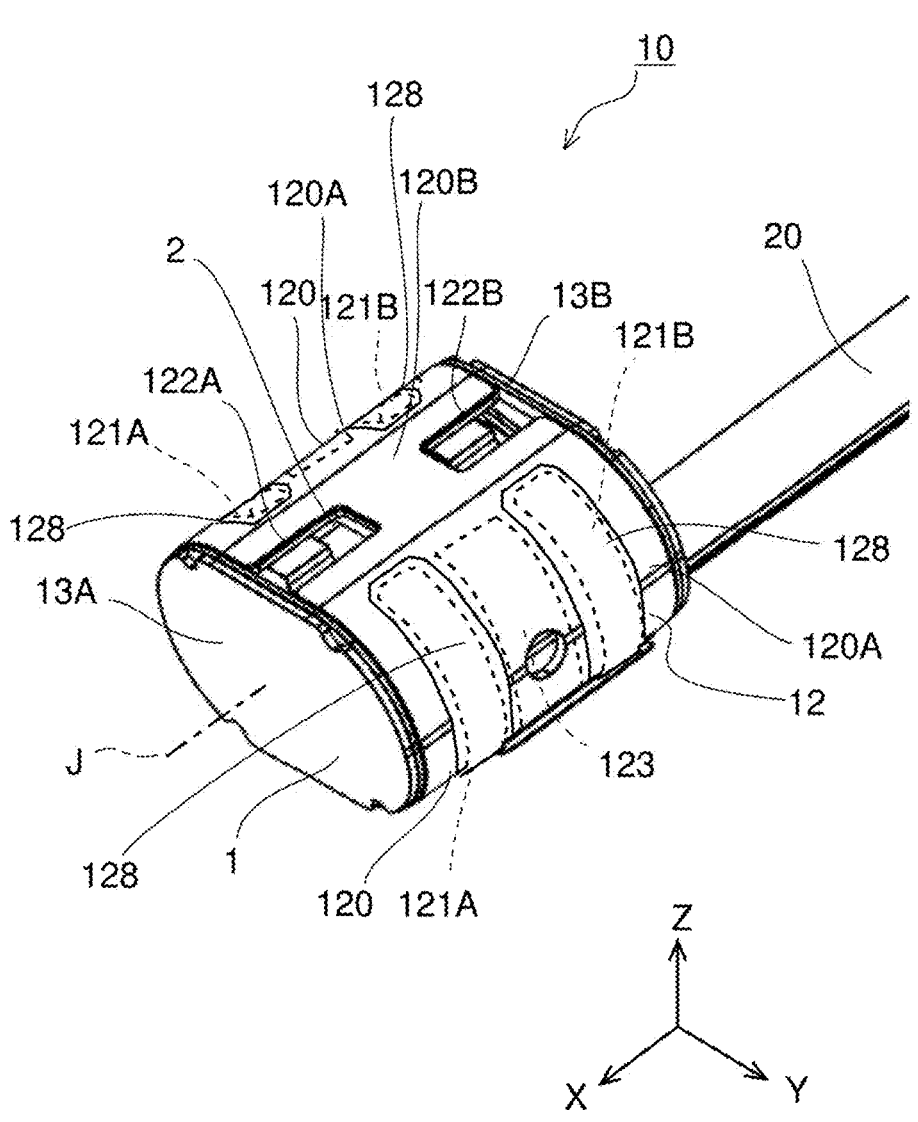
FIG. 7 is a perspective view of the vibration motor according to a second example embodiment of the present disclosure.

Next, a second example embodiment of the present disclosure will be described. FIG. 7 is a perspective view of the vibration motor 10. For the sake of convenience in description, the same reference numerals are given to the same portions as those of the first example embodiment illustrated in FIGS. 1 to 6. The second example embodiment is different from the first example embodiment in that a cover portion 128 is provided. Other portions are the same as those in the first example embodiment.

The cover portion 128 covers the through holes 121A and 121B. That is, the housing 12 has the cover portion 128 that covers the through holes 121A and 121B. The cover portion 128 is formed of resin with which the through holes 121A and 121B is filled or a sheet material covering the through holes 121A and 121B. The cover portion 128 can prevent a foreign matter such as dust from entering the housing 12. Further, strength of the peripheral wall portion 120 can be improved. Note that the cover portion 128 may cover a part of the through holes 121A and 121B. Further, the cover portion 128 may cover the through holes 122A and 122B.

Figure 8:
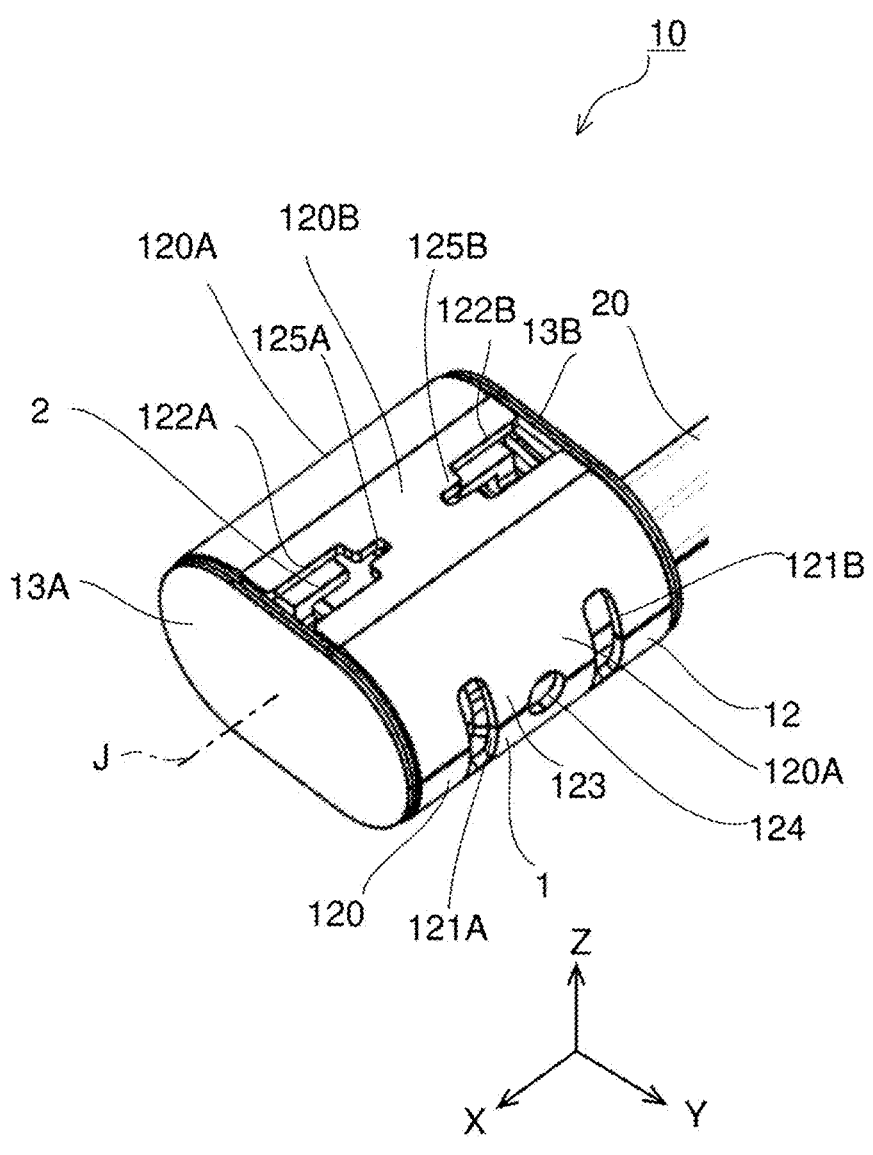
FIG. 8 is a perspective view of the vibration motor according to a third example embodiment of the present disclosure.

Next, a third example embodiment of the present disclosure will be described. FIG. 8 is a perspective view of the vibration motor 10. For the sake of convenience in description, the same reference numerals are given to the same portions as those of the first example embodiment illustrated in FIGS. 1 to 6. In the third example embodiment, the entire peripheral wall portion 120 includes a magnetic metal plate, and the magnetic portion 123 adjacent to the through holes 121A and 121B is formed by the peripheral wall portion 120 of the magnetic metal plate. Further, the peripheral wall portion 120 has lead-out holes 125A and 125B. Other portions are the same as those in the first example embodiment.

The peripheral wall portion 120 is formed, for example, as a magnetic metal plate is bent around the central axis J. At this time, the through holes 121A and 121B, the through holes (notched through holes) 122A and 122B, the coil exposure hole 124, and the lead-out holes 125A and 125B are formed by press molding before bending of the magnetic metal plate. As the through holes 121A and 121B are provided, the magnetic portion 123 constitutes a part of the peripheral wall portion 120 and is disposed in a part of the peripheral wall portion. According to this configuration, the peripheral wall portion 120 and the magnetic portion 123 are integrated, and manufacturing cost of the peripheral wall portion 120 can be reduced.

Further, the magnetic portion 123 is formed on the entire peripheral wall portion 120, and a wide region of the magnetic portion 123 can be secured. By the above, it is possible to further reduce vibration of the core portion 21 in a state where the coil 11 is not energized. Note that a region of the magnetic portion 123 is made smaller as the through holes 121A and 121B, the through holes (notched through holes) 122A and 122B, the coil exposure hole 124, or the lead-out holes 125A and 125B are formed in the peripheral wall portion 120. At this time, interference between a magnetic force generated by the coil 11 and the magnetic portion 123 can be reduced. By the above, it is possible to prevent lowering in driving efficiency of the vibration motor 10 and to reduce power consumption.

The lead-out holes 125A and 125B are formed by protruding in the axial direction from an inner end in the axial direction X of the through holes (notched through holes) 122A and 122B and being notched. Specifically, the lead-out hole 125A is formed by being notched to have a smaller width than the through hole (notched through hole) 122A from an end edge on the second side in the axial direction X of the through hole (notched through hole) 122A to the second side in the axial direction X. Further, the lead-out hole 125B is formed by being notched to have a smaller width than the through hole (notched through hole) 122B from an end edge on the first side in the axial direction X of the through hole (notched through hole) 122B to the first side in the axial direction X. By forming the lead-out holes 125A and 125B, it is possible to easily draw out a lead wire (not illustrated) connected to the coil 11 to the outside of the peripheral wall portion 120 via one of the lead-out holes 125A and 125B. Note that the lead wire may be drawn out from either of the lead-out holes 125A and 125B.

Note that, in the present example embodiment, a pair of the lead-out holes 125A and 125B are provided so as to face each other in the radial direction, but may be provided in any one location.

Figure 9:
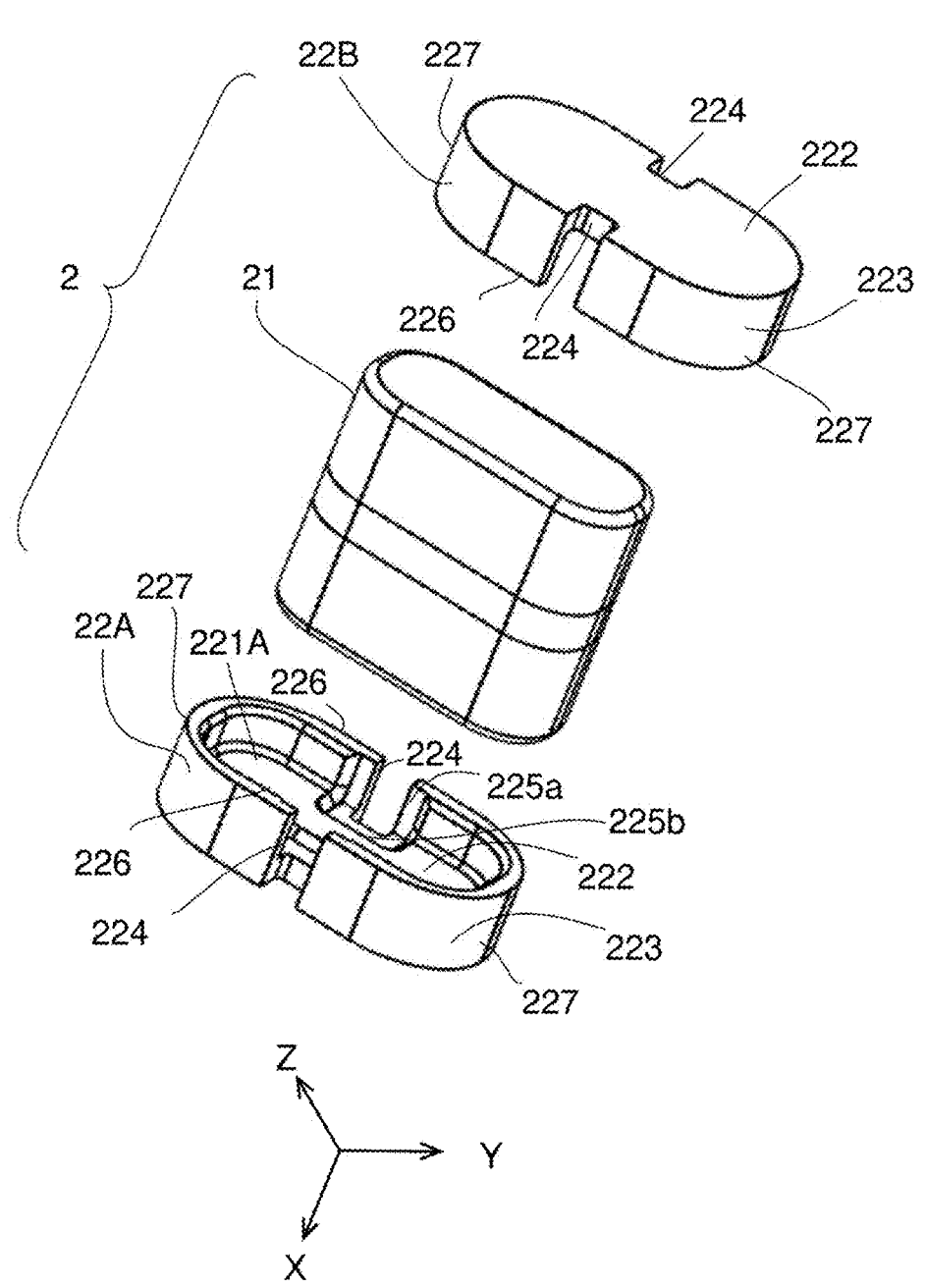
FIG. 9 is an exploded perspective view of a movable portion according to a fourth example embodiment of the present disclosure.

Next, a fourth example embodiment of the present disclosure will be described. FIG. 9 is an exploded perspective view of the movable portion 2. For the sake of convenience in description, the same reference numerals are given to the same portions as those of the first example embodiment illustrated in FIGS. 1 to 6. In the fourth example embodiment, a shape of the holders 22A and 22B is different from that of the first example embodiment. Other portions are the same as those in the first example embodiment.

The holder wall portion 223 of each of the holders 22A and 22B has a straight portion 226 and a curved portion 227. The straight portion 226 extends linearly as viewed in the axial direction X and is formed in a flat plate shape. The curved portion 227 is formed in an arc shape protruding to the outer side in the radial direction when viewed from the axial direction X. The straight portion 226 and the curved portion 227 are disposed to face each other in the radial direction.

Further, the holders 22A and 22B have a holder outer recessed portion 224 and holder inner recessed portions 225a and 225b. The holder outer recessed portion 224 is recessed to the inner side in the radial direction from an inner end to an outer end in the axial direction X on an outer peripheral surface of the holders 22A and 22B. Further, the holder outer recessed portion 224 is disposed on the straight portion 226. In the present example embodiment, a pair of the holder outer recessed portions 224 are disposed to face each other in the radial direction, but may be provided at only one location.

Further, the holder outer recessed portion 224 faces the notched through holes 122A and 122B in the radial direction. By the above, it is possible to prevent a lead wire connected to the coil 11 from coming into contact with the holders 22A and 22B when the movable portion 2 vibrates in the central axis J direction.

When fixed to the core portion 21, the holders 22A and 22B sandwich the holder wall portion 223 by a jig (not illustrated) from the outer side in the radial direction. At this time, by providing the straight portion 226 on the holder wall portion 223, it is possible to reduce a gap formed between the jig and the holder wall portion 223 and to stably sandwich the holders 22A and 22B. Therefore, work efficiency of assembling the movable portion 2 is improved. Further, positional accuracy of the core portion 21 with respect to the holders 22A and 22B can be improved.

Further, by forming the holder outer recessed portion 224, it is possible to dispose a protruding portion (not illustrated) formed on the jig inside the holder outer recessed portion 224. By the above, the holders 22A and 22B can be more stably sandwiched by the jig.

The holder inner recessed portion (first holder inner recessed portion) 225a and the holder inner recessed portion (second holder inner recessed portion) 225b are disposed along a periphery of the holder outer recessed portion 224. The holder inner recessed portion (first holder inner recessed portion) 225a is formed such that an inner peripheral surface of the holder wall portion 223 is recessed to the outer side in the radial direction. The holder inner recessed portion (second holder inner recessed portion) 225b is formed such that an inner surface (inner end surface in the axial direction X) of the holder plate portion 222 is recessed to the outer side in the axial direction.

In a case where the holders 22A and 22B are fixed to the core portion 21 via an adhesive, the adhesive is accumulated in the holder inner recessed portion (first holder inner recessed portion) 225a and the holder inner recessed portion (second holder inner recessed portion) 225b. By the above, it is possible to prevent the adhesive from flowing out of the holders 22A and 22B. Note that, in the present example embodiment, the holder outer recessed portion 224 is formed to penetrate the holder wall portion 223 in the radial direction, but does not need to penetrate the holder wall portion 223. This makes it possible to prevent the adhesive from flowing out of the holders 22A and 22B.

The example embodiments of the present disclosure are described above. It is to be noted that the scope of the present disclosure is not limited to the above-described example embodiments. It is possible to implement the present disclosure by adding various modifications to the above-described example embodiments within a range not departing from the spirit of the disclosure.

For example, in the first example embodiment and the second example embodiment, the magnetic portion 123 is formed integrally with the peripheral wall portion 120 by insert molding, but a magnetic metal sheet may be bonded to an inner peripheral surface of the resin-molded peripheral wall portion 120. At this time, the peripheral wall portion 120 is a resin molded article, and the magnetic portion 123 is disposed on an inner peripheral surface of the peripheral wall portion 120 and is formed of a member different from the peripheral wall portion 120.

Further, the magnetic portion 123 includes a magnetic metal sheet adhered to an inner peripheral surface of the peripheral wall portion 120. By the above, the magnetic portion 123 can be retrofitted, and manufacturing cost of the housing 12 can be reduced. Further, it is possible to reduce weight of the housing 12 by thinning the magnetic metal sheet. Note that, as the magnetic metal sheet, a stainless steel metal sheet which is a magnetic body is suitably used.

Further, a resin layer containing a magnetic grain may be applied to an inner peripheral surface of the peripheral wall portion 120 molded in advance. At this time, the magnetic portion 123 includes a magnetic grain laminated on an inner peripheral surface of the peripheral wall portion 120. By the above, the magnetic portion 123 can be retrofitted, and manufacturing cost of the housing 12 can be reduced. Further, weight of the housing 12 can be reduced. Note that a stainless steel particle is suitably used for the magnetic particle. Further, in a case where the peripheral wall portion 120 is a resin molded article, the through holes 121A and 121B do not need to be provided.

Further, the peripheral wall portion 120 may be formed of a material other than resin. For example, nonmagnetic metal can be used, and specific examples of the nonmagnetic metal include copper, aluminum, and stainless steel (SUS304). Further, as another example embodiment, the peripheral wall portion 120 may be formed of magnetic metal, and a partial surface of the peripheral wall portion 120 excluding the magnetic portion 123 may be plated with nonmagnetic metal. By the above, a magnetic force in the radial direction acting between the peripheral wall portion 120 excluding the magnetic portion 123 and the coil 11 is reduced. Therefore, lowering in driving efficiency of the vibration motor 10 can be further prevented.

Further, the holders 22A and 22B of the fourth example embodiment may be used for the holders 22A and 22B of the second example embodiment or the third example embodiment.

Further, the through holes 121A and 121B extend in parallel, but do not need to extend in parallel. Further, the through holes 121A and 121B do not need to be formed in plane symmetry with respect to a plane perpendicular to the axial direction with the magnetic portion 123 interposed between them. Specifically, the through holes 121A and 121B may be disposed to be shifted in the circumferential direction. Further, the through holes 121A and 121B may communicate with the through holes (notched through holes) 122A and 122B.

Further, in the first example embodiment, the touch pen 40 is exemplified as a tactile device, but the tactile device is not limited to the touch pen 40.

As described above, the vibration motor (10) according to an aspect of the present disclosure includes the stationary portion (1) and the movable portion (2) that is capable of vibrating in a central axis direction with respect to the stationary portion. The stationary portion includes the coil (11) disposed on the outer side in the radial direction of the movable portion, and the housing (12) that houses the movable portion and the coil. The movable portion includes the core portion 21 including the magnets 21A and 21B. The housing includes the peripheral wall portion (120) that is disposed on the outer side in the radial direction of the coil and extends in the axial direction, and the magnetic portion 123 that is disposed on at least a part of the peripheral wall portion and includes a magnetic body. At least a part of the magnetic portion faces the coil in the radial direction and extends in the circumferential direction. The peripheral wall portion has the through holes (121A, 121B) adjacent to the magnetic portion in the axial direction and extending in the circumferential direction (first configuration).

Further, in the first configuration, a surface area of an inner peripheral surface of the magnetic portion may be half or less of a surface area of an inner peripheral surface of the peripheral wall portion (second configuration).

Further, in the first or second configuration, a length in the axial direction of the magnetic portion may be half of less of a length in the axial direction of the peripheral wall portion, and at least a part of the magnetic portion may overlap a central portion in the axial direction of the peripheral wall portion in the radial direction (third configuration).

Further, in any of the first to third configurations, a length in the axial direction of the magnetic portion may be equal to or more than a half of a length in the axial direction of the core portion (fourth configuration).

Further, in any of the first to fourth configurations, a length in the axial direction of the magnetic portion may be substantially the same as a length in the axial direction of the coil (fifth configuration).

Further, in any of the first to fifth configurations, the peripheral wall portion may be a resin molded article, and the magnetic portion may be integrated with the peripheral wall portion (sixth configuration).

Further, in any of the first to sixth configurations, the magnetic portion may be made of stainless steel which is a magnetic body (seventh configuration).

Further, in any of the first to seventh configurations, the through holes may be disposed on both sides in the axial direction of the magnetic portion, and may be formed plane symmetry with respect to a plane perpendicular to the axial direction with the magnetic portion interposed between them (eighth configuration).

Further, in any of the first to eighth configurations, the housing may further include a cover portion that covers the through hole (ninth configuration).

Further, in any of the first to ninth configurations, the magnetic portion adjacent to the through hole may be formed by the peripheral wall portion of a magnetic metal plate (tenth configuration).

Further, in any of the first to tenth configurations, the peripheral wall portion may have a notched through hole (122A, 122B) disposed adjacent to the through hole in the circumferential direction and formed by being notched in the axial direction from an outer end in the axial direction of the peripheral wall portion, and a lead-out hole (125A, 125B) formed by protruding in the axial direction from an inner end in the axial direction of the notched through hole and being notched (eleventh configuration).

Further, in any of the first to eleventh configurations, the peripheral wall portion may have a coil exposure hole (124) at least a part of which is disposed to face the coil in the radial direction and penetrates in the radial direction (twelfth configuration).

Further, in the twelfth configuration, a width in the axial direction of the coil exposure hole may be smaller than a length in the axial direction of the coil (thirteenth configuration).

Further, in any of the first to thirteenth configurations, the movable portion may include a holder (22A, 22B) that holds the core portion by sandwiching the core portion from both sides in the axial direction, the holder may include a holder plate portion (222) having a plate shape, the holder plate portion (222) facing the core portion in the axial direction, and a holder wall portion (223) that protrudes in the axial direction from an outer peripheral edge of the holder plate portion and surrounds an end portion in the axial direction of the core portion, and the holder wall portion may include a straight portion (226) extending linearly as viewed in the axial direction (fourteenth configuration).

Further, in the fourteenth configuration, the holder may include a holder outer recessed portion (224) recessed to the inner side in the radial direction from an inner end to an outer end in the axial direction on an outer peripheral surface, and the holder outer recessed portion may be disposed on the straight portion (fifteenth configuration).

Further, in the fifteenth configuration, the holder may include a first holder inner recessed portion (225a) disposed along the holder outer recessed portion and formed such that an inner peripheral surface of the holder wall portion is recessed to the outer side in the radial direction, and a second holder inner recessed portion (225b) disposed along the holder outer recessed portion and formed such that an inner surface of the holder plate portion is recessed to the outer side in the axial direction (sixteenth configuration).

Further, in the eleventh configuration, the movable portion may include a holder (22A, 22B) that holds the core portion by sandwiching the core portion from both sides in the axial direction, the holder may include a holder plate portion (222) having a plate shape, the holder plate portion (222) facing the core portion in the axial direction, and a holder wall portion (223) that protrudes in the axial direction from an outer peripheral edge of the holder plate portion and surrounds an end portion in the axial direction of the core portion, and the holder may include a holder outer recessed portion (224) penetrating in the radial direction of the holder wall portion from an inner end to an outer end in the axial direction on an outer peripheral surface, and the holder outer recessed portion may face the notched through hole in the radial direction (seventeenth configuration).

Further, a tactile device (40) according to an aspect of the present disclosure includes a vibration motor (10) having any of the first to seventeenth configurations, and a case (30) having a cylindrical shape, the case (30) extending in an axial direction and housing the vibration motor (eighteenth configuration).

The present disclosure can be used for a vibration motor mounted on various devices such as a touch pen, for example.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A vibration motor comprising:
a stationary portion; and
a movable portion capable of vibrating in a central axis direction with respect to the stationary portion; wherein
the stationary portion includes:
a coil located on an outer side in a radial direction of the movable portion; and
a housing that houses the movable portion and the coil;
the movable portion includes a core portion including a magnet;
the housing includes:
a peripheral wall portion located on an outer side in the radial direction of the coil and extending in an axial direction; and
a magnetic portion that is located on at least a portion of the peripheral wall portion and includes a magnetic body;
at least a portion of the magnetic portion extends in a circumferential direction to oppose the coil in the radial direction; and
the peripheral wall portion includes a through hole that is adjacent to the magnetic portion in the axial direction and extends in the circumferential direction.

2. The vibration motor according to claim 1, wherein a surface area of an inner peripheral surface of the magnetic portion is about one half or less of a surface area of an inner peripheral surface of the peripheral wall portion.

3. The vibration motor according to claim 1, wherein
a length in the axial direction of the magnetic portion is about one half or less of a length in the axial direction of the peripheral wall portion; and
at least a portion of the magnetic portion overlaps a central portion in the axial direction of the peripheral wall portion in the radial direction.

4. The vibration motor according to claim 1, wherein a length in the axial direction of the magnetic portion is about one half or more of a length in the axial direction of the core portion.

5. The vibration motor according to claim 1, wherein a length in the axial direction of the magnetic portion is equal or substantially equal to a length in the axial direction of the coil.

6. The vibration motor according to claim 1, wherein
the peripheral wall portion includes a resin molded structure; and
the magnetic portion is integrated with the peripheral wall portion.

7. The vibration motor according to claim 1, wherein the magnetic portion includes stainless steel which is a magnetic body.

8. The vibration motor according to claim 1, wherein the through holes are located on two sides in the axial direction of the magnetic portion, and are in plane symmetry with respect to a plane perpendicular to the axial direction with the magnetic portion interposed therebetween.

9. The vibration motor according to claim 1, wherein the peripheral wall portion further includes a cover portion that covers the through hole.

10. The vibration motor according to claim 1, wherein
the peripheral wall portion includes a magnetic metal plate; and
the magnetic portion adjacent to the through hole includes the peripheral wall portion of the magnetic metal plate.

11. A tactile device comprising:
the vibration motor according to claim 1; and
a case having a cylindrical shape and extending in an axial direction and housing the vibration motor.

12. The vibration motor according to claim 1, wherein the peripheral wall portion includes:
a notched through hole that is located adjacent to the through hole in the circumferential direction and is defined by being notched from an outer end on a first side in the axial direction of the peripheral wall portion to a second side in the axial direction or from an outer end on the second side in the axial direction of the peripheral wall portion to the first side in the axial direction; and
a lead-out hole defined by protruding in the axial direction from an inner end in the axial direction of the notched through hole and being notched.

13. The vibration motor according to claim 12, wherein
the movable portion includes a holder that holds the core portion by sandwiching the core portion from two sides in the axial direction;
the holder includes:
a holder plate portion having a plate shape, the holder plate portion opposing the core portion in the axial direction; and
a holder wall portion that protrudes in the axial direction from an outer peripheral edge of the holder plate portion and surrounds an end portion in the axial direction of the core portion; and the holder includes a holder outer recessed portion penetrating in the radial direction of the holder wall portion from an inner end to an outer end in the axial direction on an outer peripheral surface; and
the holder outer recessed portion opposes the notched through hole in the radial direction.

14. The vibration motor according to claim 1, wherein the peripheral wall portion includes a coil exposure hole, at least a portion of which opposes the coil in the radial direction, and penetrating in the radial direction.

15. The vibration motor according to claim 14, wherein a width in the axial direction of the coil exposure hole is smaller than a length in the axial direction of the coil.

16. The vibration motor according to claim 1, wherein
the movable portion includes a holder that holds the core portion by sandwiching the core portion from both sides in the axial direction;
the holder includes:
a holder plate portion having a plate shape and opposing the core portion in the axial direction; and
a holder wall portion that protrudes in the axial direction from an outer peripheral edge of the holder plate portion and surrounds an end portion in the axial direction of the core portion; and
the holder wall portion includes a straight portion extending linearly as viewed in the axial direction.

17. The vibration motor according to claim 16, wherein
the holder includes a holder outer recessed portion recessed to an inner side in the radial direction from an inner end to an outer end in the axial direction on an outer peripheral surface; and
the holder outer recessed portion is located on the straight portion.

18. The vibration motor according to claim 17, wherein the holder includes:
a first holder inner recessed portion located along the holder outer recessed portion and defined such that an inner peripheral surface of the holder wall portion is recessed to an outer side in the radial direction; and
a second holder inner recessed portion located along the holder outer recessed portion and defined such that an inner surface of the holder plate portion is recessed to an outer side in the axial direction.

\*    \*    \*    \*    \*